United States Patent [19]
Meyer, Jr. et al.

[11] Patent Number: 5,588,041
[45] Date of Patent: Dec. 24, 1996

[54] CELLULAR SPEAKERPHONE AND METHOD OF OPERATION THEREOF

[75] Inventors: George W. Meyer, Jr., Buffalo Grove; Allen Wong, Streamwood; John H. Spears, McHenry; David L. Bond, Hoffman Estates; Thomas F. Vondrak, Libertyville, all of Ill.

[73] Assignee: Motorola, Inc., Schaumburg, Ill.

[21] Appl. No.: 369,021

[22] Filed: Jan. 5, 1995

[51] Int. Cl.$^6$ ........................ H04Q 7/32
[52] U.S. Cl. ............ 379/59; 379/420; 379/432
[58] Field of Search .............. 379/58, 59, 420, 379/421, 432, 433; 455/89, 90

[56] References Cited

U.S. PATENT DOCUMENTS

| | | | |
|---|---|---|---|
| 4,741,018 | 4/1988 | Potratz et al. | |
| 4,843,621 | 6/1989 | Potratz. | |
| 4,991,197 | 2/1991 | Morris | 379/58 |
| 5,018,188 | 5/1991 | Kowalski et al. | |
| 5,224,151 | 6/1993 | Bowen et al. | 379/58 |
| 5,261,121 | 11/1993 | Hashimoto | 455/89 |

OTHER PUBLICATIONS

Northern Telecom, Meridian Business Set M5312, User's Guide, 1989.
American Honda Motor Co., Cellular Telephone, User's Manual, Aug. 1994.
JRC Canada, Inc., JRC International Inc., Integrated Cellular Telephone Model ICT-8820, User's Guide, Jun. 1994.
Uniden America Corporation, CP 1700 Cellular Telephone Operating Guide, 1994.
Motorola, Inc. Cellular Subscriber Group, Cellular Mobile and Carry Phone Accessory, NAM. Programming Guide, 1993.
Motorola, Inc. Pan American Cellular Subscriber Group, Cellular Mobile and Carry Phone Accessory, Installation Manual, 1993.
Motorola, Inc. Pan American Cellular Subsriber Group, cellular telephone user's manual, 1993.

Primary Examiner—Dwayne D. Bost
Attorney, Agent, or Firm—Randall S. Vaas

[57] ABSTRACT

A cellular speakerphone (100) includes a housing (101) containing a transceiver circuit (203), a processor and switching circuit (205), a coupler (209), and a hands-free user interface (207). The processor and switching circuit (205) and the hands-free user interface (207) operate the cellular speakerphone (100) in a default hands-free mode that is automatically interruptable to permit the cellular speakerphone (100) to operate in a handset mode when an optional handset (127) is operably coupled to the cellular speakerphone (100) via the coupler (209).

15 Claims, 4 Drawing Sheets

CELLULAR SPEAKERPHONE AND METHOD OF OPERATION THEREOF

BACKGROUND OF THE INVENTION

1. Field of the Invention

This invention relates generally to cellular communication devices and more particularly to cellular speakerphones.

2. Description of the Related Art

Radio frequency (RF) communication systems, such as cellular radiotelephone systems, permit a user to communicate from locations within a broad area. Commercially available cellular radiotelephones include both portable units that can be carried by the user and mobile units that are permanently mounted to a vehicle. Each of the aforementioned cellular radiotelephones has characteristics that make it preferable with respect to the other.

Portable cellular radiotelephones, such as MicroTac™ radiotelephones manufactured and sold by Motorola, Inc., are revered for their compact size. These cellular radiotelephones include a housing containing a transceiver circuit and a user interface. The user interface includes a keypad, a display, a microphone, and a speaker. The portable cellular radiotelephone is typically powered by a rechargeable battery which is attached to the housing to provide operating power and detached once depleted for recharging. Therefore, portable cellular telephones must be made to operate at low power so as to increase the time period between recharging.

Mobile cellular radiotelephones, such as the Series IV Cellular Mobile Transceiver radiotelephone manufactured and sold by Motorola, Inc., are permanently mounted within a vehicle or transported within a shoulder bag and powered via the vehicle's electrical system. As a result, the mobile cellular radiotelephone may operate at a higher power level than the portable cellular radiotelephone without detrimentally affecting its operating time while benefiting from an increased transmission range.

To augment ease of operation, hands-free accessories are utilized in conjunction with both portable and mobile cellular radiotelephones. Hands-free accessories are attachable external apparatuses that allow the portable or mobile cellular radiotelephone to function in a manner similar to a conventional speaker phone. This provides the user with free use of his/her hands for other activities, such as taking notes, during a cellular radiotelephone call. Motorola, Inc. does not condone conversing on a cellular radiotelephone while driving, an action that is unlawful in some states.

Therefore, there is a need for a cellular radiotelephone that benefits from the advantages of each of the portable cellular radiotelephones, mobile cellular radiotelephones, and hands-free accessories.

DETAILED DESCRIPTION OF THE PREFERRED EMBODIMENTS

A cellular speakerphone includes a housing containing a transceiver circuit, a processor coupled to the transceiver circuit, a hands-free user interface coupled to the transceiver circuit through the processor, and a coupler for communicating with an optional handset. The hands-free user interface has a microphone and a speaker for operating the cellular speakerphone in a default hands-free mode. The default hands-free mode is automatically interruptable to permit the cellular speakerphone to operate in a secondary handset mode when an optional handset is operably coupled to the cellular speakerphone.

Figure 1:
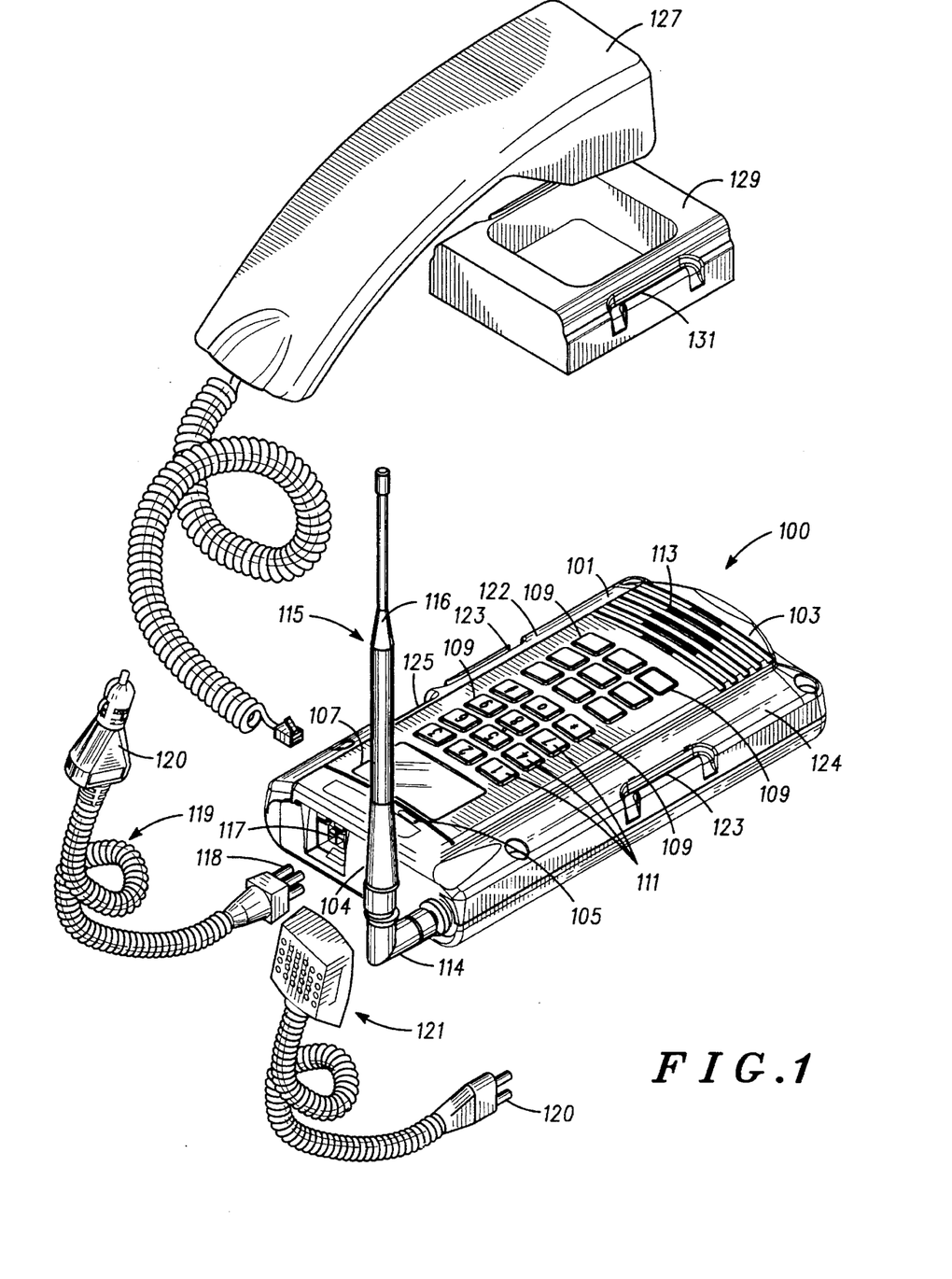
FIG. 1 illustrates a front, top, and left side perspective view of a cellular speakerphone and accessories that may be used therewith.

FIG. 1 illustrates a cellular speakerphone 100 and optional accessories that may be used therewith. The cellular speakerphone 100 is a fully functional cellular subscriber unit integrated into a single housing 101 and operating in a default hands-free mode. The hands-free mode permits the cellular speakerphone 100 to operate in a manner similar to that of a conventional landline speakerphone; that is, once a call has been placed or received, the user participates in the call by directing speech towards, and listening in the direction of, the cellular speakerphone 100. No physical action (aside from speaking and listening) on the part of the user is required during the duration of the call. Unlike current cellular radiotelephones, the cellular speakerphone 100 does not require additional components, such as a handset, an external microphone, and/or an external speaker, to operate in hands-free mode. Aside from the added convenience of use, the compact, integral nature of the cellular speakerphone 100 minimizes the area required for operation and installation, improves storage capability, and cost-effectively simplifies manufacturing by eliminating the housings, cables, connectors, and circuitry required for the additional components.

Additionally, unlike low power portable cellular radiotelephones that are concerned with maximizing operation time between re-charges of their portable batteries, the cellular speakerphone 100, which is powered by alternative power sources (see below), is capable of operating at 3 W. As a result, the cellular speakerphone 100 has a longer range than lower watt units, permitting it to serve as an emergency device for communicating in more remote regions.

The default hands-free operating mode of the cellular speakerphone 100 is accomplished by integrating the transceiver circuit with components that are collectively referred to as a user interface. In conventional cellular radiotelephones, the user interface, which may include a microphone, a display, a keypad, and/or a speaker, is typically contained in a handset that must be held by a user participating in a call. For example, the user interface of a mobile cellular radiotelephone permanently mounted in a vehicle comprises a handset that is coupled to a transceiver module. The transceiver module is typically located in the trunk of the vehicle. The user interface of the portable cellular radiotelephones is typically contained with the transceiver circuit in a housing that serves as a handset.

The location and arrangement of the components comprising the user interface, or more specifically, the hands-free user interface, of the cellular speakerphone 100 lend to its convenient integrated nature. FIG. 1 shows that the components comprising the hands-free user interface of the cellular speakerphone 100 are carried on a raised, front outer surface 103 of the housing 101. The raised, front outer surface 103 longitudinally interconnects a top outer surface 104 of the cellular speakerphone 100 and a bottom outer surface of the cellular speakerphone 100.

A microphone opening 105 is disposed on the raised, front outer surface 103 below the top outer surface 104. The microphone opening 105 permits audible transmit speech provided by the user to reach a microphone 303 (see FIG. 4) carried on the underside of the raised, front outer surface 103.

A display opening 107 is disposed immediately below the microphone opening 105 on the raised, front outer surface 103. The display opening 107 allows the user to view a display 305 (see FIG. 4) contained within housing 101. The display 305 visually provides a user with operational information, such as signal strength and call status. The display 305 may be backlit to permit convenient operation of the cellular speakerphone 100 at night or in the dark.

A plurality of keypad openings 109 (see FIG. 4) are disposed on the raised, front outer surface 103 below the display opening 107. Extending upward from beneath the raised, front outer surface 103 and through the plurality of keypad openings 109 are a corresponding plurality of actuatable keys 111. The plurality of actuatable keys 111 are backlit to permit convenient operation of the cellular speakerphone 100 at night or in the dark. The plurality of actuatable keys 111 comprises a portion of a keypad circuit 307 that may include conventional telephone keys (0, 1, 2, . . . , 9, *, and #) and functional keys (such as recall (RCL), store (STO), power on/off (PWR), function (FCN), clear (CLR), volume up (^), volume down (v), send (SND), and end (END)) for operating the cellular speakerphone 100. The keypad circuit 307 is used to initiate and, typically, receive a call. When initiating a call, the user enters the number to be called by actuating the appropriate keys of the keypad circuit 307. The user subsequently actuates the key designated "SND," which effectively outputs the number to establish communication. When receiving a call, the user also actuates the key designated "SND" to take the cellular speakerphone 100 off-hook and, thus, receive the incoming call.

By locating the plurality of keypad openings 109 below the display opening 107, the user is able to actuate any of the plurality of actuatable keys 111 without obstructing the display opening 107 and the display 305 disposed therebeneath. When initiating a call, the numerals keyed-in by the user are displayed by the display 305. This arrangement allows the user the convenience of easy visual verification of the actuation. This location of the display opening 107 ensures that the user's view will not become obstructed while the user enters a number to be called.

A speaker opening 113 is disposed in the raised, front outer surface 103 below the plurality of keypad openings 109. The speaker opening 113 is positioned over a speaker 309. The user receives audible signals produced by the speaker 309 carried on the underside of the raised, front outer surface 103.

The top outer surface 104 (see FIG. 1) of the housing 101 includes an antenna 115 extending therefrom. The antenna 115 includes a first antenna portion 114 extending outward from the top outer surface 104. A joint terminating the first antenna portion 114, angles the antenna 115 approximately ninety degrees relative to the first antenna portion 114, such that a second whip antenna portion 116 thereof extends in an upward direction perpendicular to the raised, front outer surface 103 of the cellular speakerphone 100. The second whip antenna portion 116 may be connected to the first antenna portion 114 by a hinge so as to be multi-positional.

When the cellular speakerphone 100 is powered-on, the user places the antenna 115 such that the second whip antenna portion 116 extends perpendicularly upward with respect to the raised, front outer surface 103 of the cellular speakerphone 100. When the cellular speakerphone 100 is not in use and is to be stored, the user may fold the second whip antenna portion 116 to be juxtaposed with, and extend along, a left portion of the housing 101, thereby minimizing the area required for storing the cellular speakerphone 100.

The top outer surface 104 of the housing 101 includes an opening providing access to a first coupler 117. The first coupler 117 mates with a first connector 118 on a cable 119. Cable 119 includes a second connector 120 that is connected to a power source, such as a cigarette lighter in a vehicle. When the second connector 120 is connected to a suitable power source, and the first connector 118 of the cable 119 is connected to the first coupler 117, power is supplied to the cellular speakerphone 100. In FIG. 1, the cable 119 is shown as a cigarette lighter adapter cable that may be attached to the first coupler 117 to power the cellular speakerphone 100 from the battery of a vehicle. Power may alternatively be provided by inserting the second connector 120 in a receptacle coupled to a rechargeable battery (not shown) carried with the cellular speakerphone 100. The first coupler 117 could alternatively be used to couple the cellular speakerphone 100 to a conventional wall outlet via a transformer so as to effectively convert the cellular speakerphone 100 into a fixed cellular subscriber unit for use in a remote area where landline communication is not economical.

The first coupler 117 also permits coupling of an optional external microphone 121 while the first connector 118 of the cable 119 is connected to the first coupler 117. The optional external microphone 121 includes a microphone connector 120 that mates with the first coupler 117. The optional external microphone 121 can be placed in close proximity of the mouth of the user when the cellular speakerphone 100 must be positioned away from the user.

The housing 101 (see FIG. 1) further includes a pair of opposing retaining troughs 123 disposed on a right edge 122 and a left edge 124. The pair of opposing retaining troughs 123 may be used to secure the cellular speakerphone 100 to a carrying case (not shown). It is envisioned that the carrying case include a pair of metal loops (not shown) attached to either side of an elastic strap (not shown) sewn to the inside of the carrying case. Each of the pair of metal loops hooks into a corresponding one of the retaining troughs 123 on housing 101 to secure the cellular speaker phone 100 to the carrying case for transport therein.

The right edge 122 (see FIG. 4) of the housing 101 is further contoured to include a second coupler 425 disposed in a recess 125. The second coupler 425 is available to couple an optional handset 127 to the cellular speakerphone 100. The second coupler 425 may be implemented using a RJ-45 connector. It will be recognized that the optional handset 127 could be coupled using another intermateable coupler, a wireless radio frequency coupler, or an infrared coupler.

As previously specified, the cellular speakerphone 100 primarily operates in a hands-free mode so as to maintain user convenience and a compact integrated nature. However, because it is often desirable to utilize a handset for reasons of privacy or where there is extremely loud background noise, the cellular speakerphone 100 is equipped to operate in a secondary handset mode. When the optional handset 127 is coupled to the cellular speakerphone 100 via the second coupler, the default hands-free mode is automatically interrupted as described in greater detail hereinafter.

Also shown in FIG. 1 is a hang-up cup 129 that is optionally associated with the optional handset 127. A top surface of the optional hang-up cup 129 includes a recessed portion for accepting a portion of the optional handset 127 (typically an ear piece portion of the handset). The recessed portion of the optional hang-up cup 129 may be equipped with protruding retractable members (not shown) that mate with integral notches (not shown) formed in the portion of the optional handset 127. A pair of opposing retaining troughs 131, of which only one is shown, are also disposed on left and right side portions of the optional hang-up cup 129. The pair of opposing retaining troughs 131, which are similar to those disposed on the edge portions of the cellular speakerphone 100, permit attachment of the optional hang-up cup 129 to a carrying case via metal loops (not shown) and elastic straps (not shown) in the same manner as described for the cellular speakerphone 100.

Figure 2:
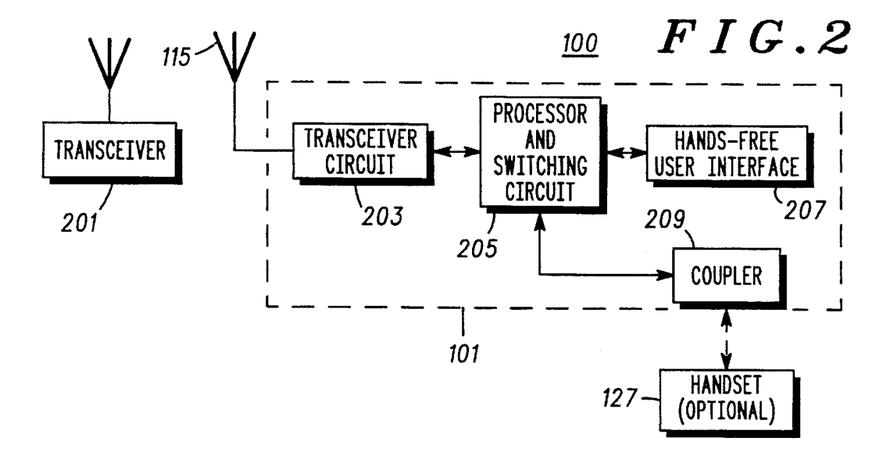
FIG. 2 is a circuit block diagram illustrating a radiotelephone communication system that may employ a cellular speakerphone.

FIG. 2 is a circuit block diagram illustrating a radiotelephone communication system that may employ the cellular speakerphone 100. A radiotelephone system typically includes a fixed transceiver 201, such as a cellular base station, that sends out radio frequency (RF) signals to radiotelephones contained within its geographic coverage area. One such radiotelephone is the cellular speakerphone 100.

The cellular speakerphone 100 (see FIG. 2) includes the antenna 115 mounted on the housing 101 and a transceiver circuit 203, a processor and switching circuit 205, and a hands-free user interface 207 disposed primarily within the housing. It will be recognized that other components of the cellular speakerphone 100, such as the transceiver circuit 203, may include additional processing circuitry. The processor and switching circuit 205 operates the hands-free user interface 207 of the cellular speakerphone 100 in a default hands-free mode that allows a proximately positioned user to participate in a cellular radiotelephone call without a handset.

The antenna 115 is used to transmit and receive RF signals to and from the fixed transceiver 201. Upon receiving signals, the antenna 115 converts the signals into electrical RF signals and transfers the signals to a receiver portion of the transceiver circuit 203. The receiver portion of the transceiver circuit 203 demodulates the received electrical RF signals, converts the demodulated RF signals into data signals, and couples the data signals to the processor and switching circuit 205. The received data signals, which are now usable by the rest of the cellular speakerphone 100, may contain voice data that is to be coupled to the hands-free user interface 207. Upon receipt, the hands-free user interface 207 audibly outputs the voice data in a form that is discernible by the proximately positioned user.

The proximately positioned user may respond to the audible output by speaking in the direction of the cellular speakerphone 100. The hands-free user interface 207 converts the user's speech into voice data that is to be coupled to a transmitter portion of the transceiver circuit 203 via the processor and switching circuit 205. The transmitter portion of the transceiver circuit 203 converts and amplifies the voice data into electrical RF signals that are further coupled to the antenna 115. The antenna 115 converts the electrical RF signals into RF signal energy for transmission through the air to the fixed transceiver 201.

The cellular speakerphone 100 may further include a speakerphone coupler 209 coupled to the processor and switching circuit 205. The cellular speakerphone coupler 209, which collectively comprises the first coupler 117 (see FIG. 1) and the second coupler 425 (see FIG. 4), permits the utilization of optional accessories with the cellular speakerphone 100. One such accessory is the optional handset 127. When coupled to the cellular speakerphone 100, the processor and switching circuit 205 may automatically interrupt the hands-free user interface 207 thereby changing the operation of the cellular speakerphone 100 from the default hands-free mode to operate the secondary handset mode. The secondary handset mode requires the user to utilize the optional handset 127 to participate in a call.

Figure 3:
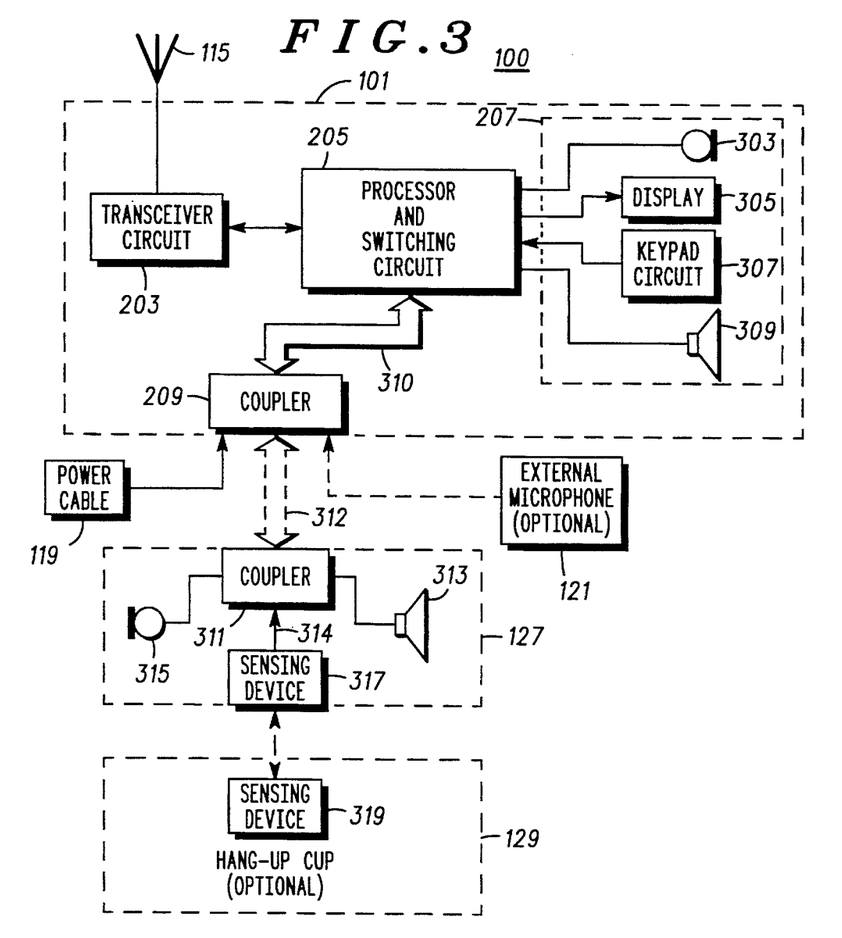
FIG. 3 is a circuit schematic in block diagram form illustrating a cellular speakerphone and accessories that may be used therewith.

FIG. 3 is a circuit schematic in block diagram form illustrating the cellular speakerphone 100 and accessories that may be used therewith. In particular, the processor and switching circuit 205 and the hands-free user interface 207, through which the cellular speakerphone 100 operates in a default hands-free mode and a secondary handset mode, are further described.

The cellular speakerphone 100 operates in the default hands-free mode. Aside from initiating and terminating a call (by pressing the "SND" and "END" keys, respectively), the user is required only to listen and speak in the proximity of the cellular speakerphone 100 for the duration of the call. In order to provide the default hands-free mode of operation, the processor and switching circuit 205 functions in conjunction with the microphone 303 and the speaker 309 of the hands-free user interface 207. The processor and switching circuit 205 couples and compresses transmit audio from the microphone 303 to the transceiver circuit 203 (the "transmit voice path"). Likewise, the processor and switching circuit 205 couples and expands the receive audio from the transceiver circuit 203 to the speaker 309 (the "receive voice path"). In both the transmit and receive voice paths, the processor and switching circuit 205 digitally samples compressed audio signals and controls the voice path gain switching to produce hands-free communication allowing the user to communicate by simultaneously talking and listening in the proximity of the cellular speakerphone 100.

The operation of the processor and switching circuit 205 to provide the default hands-free mode is similar to the operation of the microcomputer and the speakerphone control circuitry described in both U.S. Pat. No. 4,741,018, entitled "Speakerphone Using Digitally Compressed Audio to Control Voice Path Gain," by Portratz et al., granted on Apr. 26, 1988, assigned to Motorola, Inc., the assignee of the present invention, and U.S. Pat. No. 4,843,621, entitled "Speakerphone Using Digitally Compressed Audio to Detect Acoustic Feedback," by Portratz, granted on Jun. 27, 1989, and assigned to Motorola, Inc., the assignee of the present invention, both patents are incorporated herein by reference thereto.

When the optional handset 127 is coupled via the speakerphone coupler 209 and a first bus 310, the cellular speakerphone 100 may be operated in the secondary handset mode. The optional handset 127 includes a handset coupler 311 coupled between a handset speaker 313, a handset microphone 315, and a handset sensing device 317. The processor and switching circuit 205 automatically interrupts the default hands-free mode of operation to operate the cellular speakerphone 100 in the secondary handset mode when the handset sensing device 317 outputs an activation indication signal on conductor 314.

To produce the activation indication signal on conductor 314, the handset sensing device 317 must typically be a sensor or switch capable of providing a signal upon triggering or actuation. In the preferred embodiment, triggering or actuation and production of the activation indication signal on conductor 314 occurs when the user affirmatively moves the optional handset 127 for utilization and positioning in proximity of the ear and mouth. Examples of acceptable sensors and switches include, but are not limited to, a magnetic reedswitch, an optical sensor, a proximity sensor, or an orientational sensor. In the preferred embodiment, the handset sensing device 317 is a magnetic reedswitch.

The activation indication signal on conductor 314 outputted by the handset sensing device 317 is coupled to the processor and switching circuit 205 via the handset coupler 311 and the speakerphone coupler 209, whose connection is represented by a second bus 312, and the first bus 310. In order to minimize cabling, the optional handset 127 is coupled to the cellular speakerphone 100 via the second bus 312, which includes a power conductor (not shown), a ground conductor (not shown), a receive audio conductor (not shown), and a transmit audio conductor (not shown). The activation indication signal on conductor 314 outputted by the handset sensing device 317 is multiplexed on the receive audio conductor and subsequently coupled to the processor and switching circuit 205.

The multiplexing apparatus utilized to couple the optional handset 127 to the cellular speakerphone 100 in the aforementioned manner is described in U.S. Pat. No. 5,018,188, entitled "Microphone-Controller with Multifunction, Single Conductor," by Kowalski et al., granted on May 21, 1991, and assigned to Motorola, Inc., the assignee of the present invention, incorporated herein by reference thereto.

Upon reception of the activation indication signal on conductor 314, the processor and switching circuit 205 automatically switches operation of the cellular speakerphone 100 from the default hands-free mode to the secondary handset mode. The processor and switching circuit 205 redirects the receive audio, previously coupled to the speaker 309 of the hands-free user interface 207 disposed within the housing 101, to the handset speaker 313. Similarly, the processor and switching circuit 205 redirects the transmit audio path, previously coupled through the microphone 303 of the hands-free user interface 207 disposed within the housing 101, to the handset microphone 315.

The audio is redirected in the aforementioned manner for the duration of a call or until the activation indication signal on conductor 314 is no longer being received. While in the secondary handset mode, the user typically terminates the call by relinquishing use of the optional handset 127, which in turn prevents the handset sensing device 317 from outputting the activation indication signal on conductor 314. The user of the cellular speakerphone 100 also has the ability to enable predefined operating options that allow automatic switching from the secondary handset mode of operation to the default hands-free mode of operation during a call. This automatic switching is accomplished by relinquishing use of the optional handset 127, which in turn prevents the handset sensing device 317 from outputting the activation indication signal on conductor 314.

Unlike some current cellular speakerphones that require the user to manually toggle between the hands-free mode and a handset mode via the actuation of a keypad key, the cellular speakerphone 100 automatically switches between the default hands-free mode and the secondary handset mode of operation. The cellular speakerphone 100 automatically responds to the activation indication 314 provided by the handset sensing device 317. As a result, the user is able to operate the cellular speakerphone 100 with less distractions and, thus, is able to direct his/her attention to other actions being performed simultaneously with operation of the cellular speakerphone 100.

In the preferred embodiment, the optional handset 127 is associated with hang-up cup 129, which is optionally used with the optional handset 127. The optional hang-up cup 129 temporarily captures a portion of the optional handset 127; that is, the optional handset 127 is releasably attachable to the optional hang-up cup 129. The optional hang-up cup 129 includes a hang-up cup sensing device 319, preferably a magnet, that operates in conjunction with the preferential magnetic reedswitch comprising the handset sensing device 317. The hang-up cup sensing device 319 triggers the magnetic reedswitch of the handset sensing device 317 to couple the activation indication signal on conductor 314 to the processor and switching circuit 205 when the user removes the optional handset 127 from the optional hang-up cup 129. Upon (re-)attachment of the optional handset 127 to the optional hang-up cup 129, the activation indication signal on conductor 314 is terminated. It will be recognized that the hang-up cup 129 is optional; that is, the preferable magnetic reedswitch of the handset sensing device 317 may be triggered by a magnet sewn in the aforementioned carrying case associated with the cellular speakerphone 100.

The cellular speakerphone coupler 209 may couple the optional external microphone 121 to the switching circuit 301 of the hands-free user interface 207. Upon coupling, the transmit audio is switched from the microphone 303 to the optional external microphone 121. The processor and switching circuit 205 includes an impedance sensing circuit (not shown) coupled to the speakerphone coupler 209. When the optional external microphone 121 is connected to the speakerphone coupler 209, the impedance seen by this impedance sensing circuit changes. The processor and switching circuit 205 is responsive to this sensed impedance change to connect the external microphone to the transceiver circuit 203 and disconnect the microphone 303, automatically.

The communication efficiency of the default hands-free mode of operation of the cellular speakerphone 100 is enhanced by the optional external microphone 121 as the user is able to position the optional external microphone 121 in closer proximity to his/her mouth than the microphone 303 of the hands-free user interface 207. The optional external microphone 121 decreases acoustic feedback while also increasing the signal-to-noise ratio of the transmit audio (depending upon the proximity of the optional external microphone 121 to the mouth). As a result, the optional external microphone 121 allows for improved hands-free performance and alternate modes of hands-free operation. Upon coupling, the switching circuit bypasses the microphone 303 of the hands-free user interface 207 and couples the optional external microphone 121 to the processor and switching circuit 205. Although the optional external microphone 121 electrically operates in manner similar to that of the microphone 303, the communication efficiency of the default hands-free mode of operation of the cellular speakerphone 100 becomes enhanced as the user is now able to position the optional external microphone 121 in close proximity to his/her mouth. As a result, the user does not have to be concerned with directing his/her speech in the direction of the cellular speakerphone 100.

Figure 4:
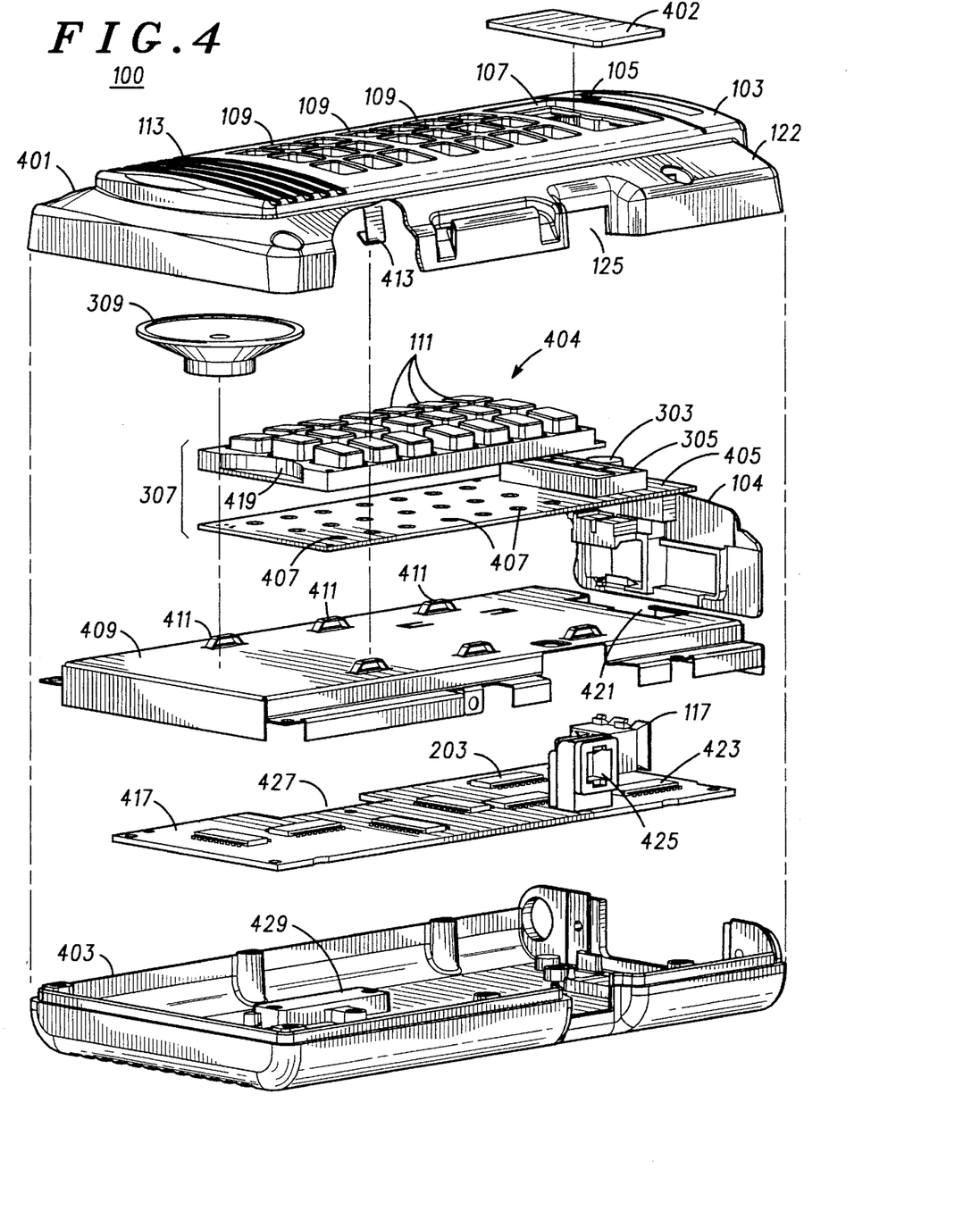
FIG. 4 illustrates an exploded front, bottom, and right side perspective view of the cellular speakerphone according to FIG. 1.

FIG. 4 illustrates an exploded front, bottom, and right side perspective view 400 of the cellular speakerphone 100. The antenna 115 has been omitted so as to properly focus on the internal structure of the cellular speakerphone 100. The cellular speakerphone 100 includes a front housing portion 401 and a rear housing portion 403, which collectively form the housing 101 initially discussed in conjunction with FIG. 1. Interconnecting the front housing portion 401 and the rear housing portion 403 is the top housing portion 104, also initially discussed with respect to FIG. 1

The front housing portion 401 includes the microphone opening 105, the display opening 107, the plurality of keypad openings 109, and the speaker opening 113. Positioned respectively behind the aforementioned openings and substantially incident to the underside of the front housing portion 401 are the microphone 303, the display 305, the keypad circuit 307 comprising a keypad 404 having a plurality of actuatable keys and a keypad circuit board 405, and the speaker 309 of the hands-free user interface 207 (see FIG. 3). The microphone 303 and the display 305 are mounted on the keypad circuit board 405. The keypad 404 resides upon an area of the keypad circuit board 405 adjacent to the display 305 that contains a plurality of contacts 407 for translating the user's key actuations into electrical signals for use by the display 305 as well as other components of the cellular speakerphone 100.

The keypad 404 (see FIG. 4), and the keypad circuit board 405, on which the microphone 303 and the display 305 are mounted, are positioned and maintained behind (or in the case of the keypad 404, through,) their respective openings on the front housing portion 401 by a plurality of opposing hook members 413, one of which is shown in the cutaway portion of the front housing portion 401. The plurality of opposing hook members 413 extend from the underside of the front housing portion 401 in a substantially orthogonal manner. The plurality of opposing hook members 413 are spaced along a right and a left extremity of the underside of the front housing portion 401. For example, the plurality of opposing hook members 413 may include six members spaced so as to be located near the corners of the keypad circuit board 405 as well as intermediate of the corners along the two longitudinal edges of the keypad circuit board 405. The plurality of opposing hook members 413 extend around and capture the keypad 404 and the keypad circuit board 405 of the keypad circuit 307. Once captured, the plurality of actuatable keys 111 comprising the keypad 404 extend through the corresponding plurality of keypad openings 109 while the keypad circuit board 405 and the plurality of contacts 407 disposed thereon are maintained in abutment against the underside of the keypad 404. In addition, the microphone 303 and the display 305 are positioned and maintained under their respective openings. A transparent display lens cover 402 is fittable to the display opening 107 to protect the display 305 disposed therebeneath.

The plurality of opposing hook members 413 are prevented from spreading apart and releasing the keypad 404 and the keypad circuit board 405 by a shielding apparatus 409. The shielding apparatus 409 may be of any suitable construction, such as a stamped metal member. A front surface of the shield apparatus 409 includes a plurality of integral loops 411 extending therefrom. Each of the plurality of opposing hook members 413 abuts against a corresponding one of the plurality of integral loops 411. When the plurality of actuatable keys comprising the keypad 404 are actuated, the plurality of integral loops 411 maintain the substantially orthogonal orientation of the plurality of opposing hook members 413.

The speaker 309, which is coupled via wires (not shown) to the keypad circuit board 405, is maintained against the underside of the front housing portion 401, beneath the speaker opening 113, by the shielding apparatus 409. A crescent-shaped notch 419 in the keypad 404 allows the speaker 309 to be closely positioned to the keypad circuit board 405. The speaker 309 is mounted away from the microphone 303 so as to achieve separation and prevent unwanted electrical interference, including acoustic feedback.

Aside from maintaining the position of the aforementioned components of the hands-free user interface 207, the shielding apparatus 409 also shields a transceiver circuit board 417 positioned therebeneath from radio frequency radiation emitted during the operation of the cellular speakerphone 100.

The shielding apparatus 409 further includes a connector opening 421. The connector opening 421 permits direct coupling of the keypad circuit board 405 to a logic circuit 423. The logic circuit 423 is carried on the transceiver circuit board 417. The logic circuit 423 includes the processor and switching circuit 205 whose operation was discussed in relation to FIG. 3.

The first coupler 117 and the second coupler 425 are mounted on the transceiver circuit board 417. The first coupler 117 and the second coupler 425 are electrically coupled to the processor and switching circuit 205 of the logic circuit 423 by conductors (not shown) on the transceiver circuit board 417. The conductors permit coupling of the activation indication signal on conductor 314 to the processor and switching circuit 205 and automatic switching between the default hands-free mode and the secondary handset mode as previously discussed in relation to FIG. 3. Although the first coupler 117 and the second coupler 425 are shown to attach physical connectors and cabling so as to minimize cost and complexity, it will be recognized by those skilled in the art that alternative wireless coupling means could be employed.

Positioned beneath the transceiver circuit board 417 is the rear housing portion 403. The transceiver circuit board 417 includes a notched opening 427 within which a 3 W power amplifier (not shown) of the transceiver circuit 203 may be positioned. When the transceiver circuit board 417 is placed incident to the rear housing portion 403, the notch 427 containing the 3 W power amplifier permits direct seating of the 3 W power amplifier upon the raised platform 429 extending from the rear housing portion 403. The rear housing portion 403, which is preferably comprised of a metallic material, dissipates, via conduction, the heat generated during the operation of the 3 W power amplifier of the transceiver circuit 203.

Figure 5:
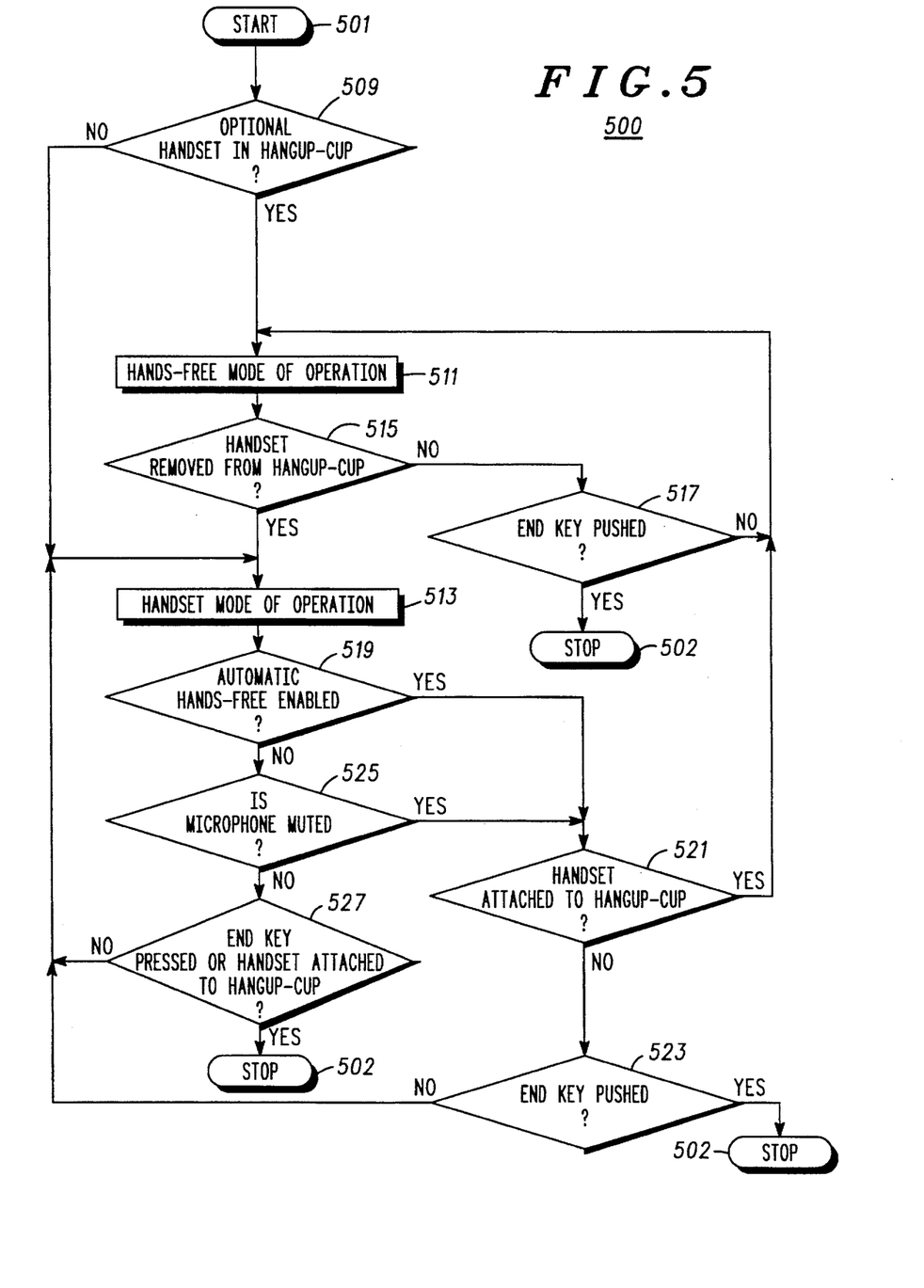
FIG. 5 is a flow chart illustrating a process of operation of the cellular speakerphone according to FIGS. 1–4.

FIG. 5 is a flow chart illustrating a process of operation 500 of a cellular speakerphone. The operation of the cellular speakerphone 100 (see FIGS. 2 and 3) is directed via a set of predetermined instructions performed by the processor and switching circuit 205. The set of predetermined instructions are contained within a memory (not shown) associated with the processor and switching circuit 205.

The process of operation 500 begins at decision block 501 when a call is initiated. A call is initiated by the user making a call from the cellular speakerphone 100 or receiving an incoming call at the cellular speakerphone 100. At decision block 501, the processor and switching circuit 205 determines whether the user has preselected an option that facilitates operation of the cellular speakerphone 100. Such options may include automatic answer, which directs the cellular speakerphone 100 to automatically answer an incoming call in a default hands-free mode after alerting the user of the incoming call.

Upon initiation of a call, the processor and switching circuit 205 determines whether the cellular speakerphone 100 is to operate in the default hands-free mode of operation or the secondary handset mode of operation. The processor and switching circuit 205 determines if the optional handset 127 has been removed from the optional hang-up cup 129, i.e., the activation indication signal on conductor 314 has been sent, at decision block 509. If the optional handset 127 has not been removed from the optional hang-up cup 129, the processor and switching circuit 205 proceeds to decision block 511 to operate the cellular speakerphone 100 in the default hands-free mode. If the optional handset 127 has been removed from the optional hang-up cup 129, the processor and switching circuit 205 performs decision block 513 to operate the cellular speakerphone 100 in the secondary handset mode of operation.

As indicated above, the cellular speakerphone 100 operates in the default hands-free mode of operation beginning at block 511. It remains in this mode of operation until the optional handset is removed from the optional hang-up cup 129, as determined at decision block 515, or the call is terminated by the user actuating the "END" key, as indicated at decision block 517. Upon termination, the process of operation 500 stops at block 502.

If it is determined in decision block 509 or decision block 515, that the optional handset 127 is removed from the optional hang-up cup 129 while the cellular speakerphone 100 is in the default hands-free mode of operation, the processor and switching circuit 205 changes to the secondary handset mode of operation as indicated at block 513.

In the secondary handset mode of operation, the processor and switching circuit 205 determines if automatic hands-free mode has been previously enabled by the user at decision block 519. If the automatic hands-free mode is actuated, the processor and switching circuit 205 determines if the optional handset 127 is in the optional hang-up cup 129, as indicated at decision block 521. If automatic hands-free mode is enabled and the optional handset 127 is not in the optional hang-up cup 129, the processor and switching circuit 205 determines if the "END" key is actuated at decision block 523. If it is actuated, the process of operation 500 stops at block 502. If it was determined at decision block 523 that the "END" key was not actuated, the processor and switching circuit 205 continues in the secondary handset mode of operation, at block 513.

If the automatic hands-free mode is not enabled, as determined at decision block 519, the processor and switching circuit 205 proceeds to decision block 525. In decision block 525, the processor and switching circuit 205 determines if the microphone has been muted. In a preferred embodiment, the microphone may be muted by actuating the "FCN" key followed by the "6" key on keypad circuit 307. If the microphone is muted and the optional handset 127 is determined to have been in the optional hang-up cup 129 at decision block 521, the processor and switching circuit 205 proceeds to block 511, switching the operation of the cellular speakerphone 100 from the secondary handset mode of operation to the default hands-free mode of operation. If the microphone is muted and the handset remains out of the optional hang-up cup 129, the call continues in the secondary handset mode of operation at block 513 until the "END" key is determined to have been actuated at decision block 523.

If the processor and switching circuit 205 determines that the automatic hands-free is not enabled, in decision block 519, and the microphone is not muted, in decision block 525, the processor and switching circuit 205 proceeds to decision block 527. In decision block 527, the processor and switching circuit 205 determines whether the call has been terminated, either by actuation of the "END" key or by placing the optional handset 127 in the optional hang-up cup 129. Upon termination, the process of operation 500 stops at block 502. If it is determined in decision block 527 that the optional handset 127 remains out of the optional hang-up cup 129 and the "END" key has not been actuated, the call continues in the secondary handset mode of operation, at block 513.

In summary, the cellular speakerphone includes a transceiver circuit, a processor, and a hands-free user interface contained within a single housing. The cellular speakerphone operates in a default hands-free mode via the hands-free user interface. Unlike current cellular radiotelephones, the cellular speakerphone 100 does not require additional components, such as a handset, an external microphone, and/or an external speaker, to operate in hands-free mode. Aside from the added convenience of use, the compact, integral nature of the cellular speakerphone 100 minimizes the area required for operation and installation, improves storage capability, and cost-effectively simplifies manufacturing by eliminating housings, cables, connectors, and circuitry. The cellular speakerphone is further capable of coupling to an optional handset. When the optional handset is coupled, the default hands-free mode is automatically interruptable to permit the cellular speakerphone to operate in a secondary handset mode.

Although the invention has been described and illustrated in the above description and drawings, it is understood that this description is by example only and that numerous changes and modifications can be made by those skilled in the art without departing from the true spirit and scope of the invention.

We claim:

1. A portable cellular speakerphone comprising:

a housing;

a transceiver circuit disposed within said housing;

a processor and switching circuit disposed in said housing and coupled to said transceiver circuit for controlling said transceiver circuit;

a coupler carried on said housing and coupled to said processor and switching circuit for communicating with an optional handset; and a hands-free user interface disposed within said housing and coupled to said processor and switching circuit, said hands-free user interface including a first microphone and a first speaker for operating the portable cellular speakerphone in a default hands-free mode, said processor and switching circuit coupling said hands-free user interface to said transceiver circuit in a default hands-free mode, and said processor and switching circuit responsive to detecting an activation indication signal from an optional handset coupled to said coupler to automatically interrupt the default hands-free mode to permit the portable cellular speakerphone to operate in a handset mode.

2. The portable cellular speakerphone of claim 1 further including the optional handset including a second microphone and a second speaker, and wherein said optional handset includes a first device generating the activation indication signal.

3. The portable cellular speakerphone of claim 2 further including a hang-up cup for releasably coupling to said optional handset, said hang-up cup including a second device for operation with said first device.

4. The portable cellular speakerphone of claim 1 wherein said default hands-free mode is further automatically interruptable to disconnect said first microphone when an optional microphone is releasably coupled to said coupler to permit the portable cellular speakerphone to operate in an enhanced hands-free mode via said optional microphone and said first speaker.

5. The portable cellular speakerphone of claim 4 wherein said processor and switching circuit senses an impedance of said coupler, said processor and switching circuit responsive to a first sensed impedance to disconnect said first microphone from said transceiver and connect the optional microphone to said transceiver, and responsive to a second sensed impedance and detection of the activation indication signal to disconnect said first microphone and said first speaker from said transceiver and connect the optional handset to said transceiver.

6. The portable cellular speakerphone of claim 1 wherein said housing further including an outer surface, the outer surface including:
   a first opening for said first microphone;
   a second opening for said first speaker;
   a third opening, a display positioned at said third opening;
   a plurality of openings disposed adjacently to said third opening; and
   a plurality of actuatable keys extending through said plurality of openings, said plurality of actuatable keys being positioned below said display such that said display remains unobstructed during actuation of said plurality of actuatable keys.

7. A cellular speakerphone comprising:
   a housing;
   a keypad positioned beneath and carried on said housing having a plurality of keys extending through a corresponding plurality of openings in said housing;
   a keypad circuit board positioned directly beneath said keypad;
   a shielding apparatus disposed beneath said keypad circuit board for maintaining said keypad and said keypad circuit board in contact;
   a transceiver circuit disposed within said housing;
   a processor and switching circuit coupled to said transceiver circuit for controlling said transceiver circuit;
   a coupler coupled to said processor and switching circuit for communicating with an optional handset; and
   a hands-free user interface disposed within said housing and coupled to said processor and switching circuit, said hands-free user interface including a first microphone and a first speaker for operating the cellular speakerphone in a default hands-free mode, said processor and switching circuit coupling said hands-free user interface to said transceiver circuit in a default hands-free mode, and said processor and switching circuit detecting that an optional handset is coupled to said coupler to automatically interrupt the default hands-free mode to permit the cellular speakerphone to operate in a handset mode when the optional handset is operably coupled to said coupler.

8. The cellular speakerphone of claim 7 further including a transceiver circuit board upon which said transceiver circuit is disposed wherein said shielding apparatus is interposed between said keypad circuit board and said transceiver circuit board for shielding said transceiver circuit board from cellular frequency radiation emitted during operation of the cellular speakerphone, said shielding apparatus further containing a plurality of integral loops extending from a surface thereof, each of said plurality of integral loops abutting a corresponding one of a plurality of integral hook members that extend both beneath said housing and around said keypad and said keypad circuit board.

9. A portable cellular speakerphone having an integral speaker and an integral microphone comprising:
   means for operating in a default hands-free mode during a call;
   means for detecting an activation indication signal from an optional handset coupled to the portable cellular speakerphone, the optional handset having an indicator for generating the activation indication signal to indicate a handset mode of operation; and
   means, responsive to said means for detecting, for automatically switching the call from the default hands-free mode to the handset mode.

10. A cellular speakerphone comprising:
   a housing having a plurality of housing openings;
   a transceiver circuit board disposed within said housing;
   a transceiver circuit disposed on said transceiver circuit board;
   a keypad positioned beneath and carried on said housing having a plurality of keys extending through at least some of said plurality of housing openings;
   a keypad circuit board positioned directly beneath said keypad;
   a shielding apparatus disposed between said keypad circuit board and said transceiver circuit board for shielding said transceiver circuit board from cellular frequency radiation emitted during operation of the cellular speakerphone, said shielding apparatus further containing a plurality of integral loops extending from a surface thereof, each of said plurality of integral loops abutting a corresponding one of a plurality of integral hook members extending beneath said housing and around both said keypad and said keypad circuit board for maintaining said keypad and said keypad circuit board in contact;
   a processor and switching circuit disposed within said housing and coupled to said transceiver circuit for controlling said transceiver circuit;
   a coupler at least partially disposed within said housing for communicating with an optional handset; and
   a hands-free user interface disposed within said housing and coupling said transceiver circuit through said processor and switching circuit and having a first microphone and a first speaker for operating the cellular speakerphone in a default hands-free mode, said default hands-free mode being automatically interruptable to permit the cellular speakerphone to operate in a handset mode when an optional handset having a second microphone and a second speaker is operably coupled thereto.

11. A method of operating a portable cellular speakerphone having an integral speaker and an integral microphone comprising the steps of:
   (a) operating in a default hands-free mode during a call;
   (b) detecting an activation indication signal from an optional handset coupled to the portable cellular speakerphone, the optional handset having an indicator for generating the activation indication signal to indicate a handset mode of operation; and (c) automatically switching, responsive to detecting, the call from the default hands-free mode to a handset mode.

12. A method of operating a portable cellular speakerphone according to claim 11 wherein said step (c) further comprises the substep of:

(c1) detecting removal of the optional handset from an optional hang-up cup, the optional hang-up cup having a device for operation with the indicator.

13. A method of operating a portable cellular speakerphone according to claim 11 further comprising the step of:

(d) switching the call from the handset mode to the default hands-free mode.

14. A method of operating a portable cellular speakerphone according to claim 13 wherein said step (d) further comprises the substep of:

(d1) attaching the optional handset to an optional hang-up cup.

15. A method of operating a portable cellular speakerphone according to claim 13 wherein said step (d) further comprises the substeps of:

(d1) muting the integral microphone of the portable cellular speakerphone; and (d2) attaching the optional handset to an optional hang-up cup.

\* \* \* \* \*